United States Patent [19]

Waterhouse

[11] 3,801,252

[45] Apr. 2, 1974

[54] APPARATUS FOR MANUFACTURING FILAMENTARY AND FIBROUS TEXTILE PRODUCTS FROM THERMOPLASTIC FILM

[75] Inventor: George Waterhouse, Macclesfield, England

[73] Assignee: Ernest Scragg & Sons Limited, Macclesfield, England

[22] Filed: Jan. 19, 1972

[21] Appl. No.: 219,011

[30] Foreign Application Priority Data
Jan. 26, 1971 Great Britain .................... 3155/71

[52] U.S. Cl. ............. 425/304, 425/66, 264/DIG. 47
[51] Int. Cl. ................................................ B29d 7/24
[58] Field of Search ..... 264/DIG. 47; 425/304, 302, 425/66; 225/3, 93, 97

[56] References Cited
UNITED STATES PATENTS

| | | | |
|---|---|---|---|
| 2,728,950 | 1/1956 | Annesser | 264/DIG. 47 |
| 3,495,752 | 2/1970 | Kim et al. | 225/97 |
| 3,650,446 | 3/1972 | Samluk | 264/DIG. 47 |
| 3,506,535 | 4/1970 | Prevorsek et al. | 264/DIG. 47 |
| 3,527,418 | 9/1970 | Spencer | 225/97 X |
| 3,500,626 | 3/1970 | Sandiford | 264/DIG. 47 |
| 3,684,142 | 8/1972 | Jackson | 264/DIG. 47 |
| 3,427,912 | 2/1969 | Nozawa et al. | 264/DIG. 47 |
| 3,565,308 | 2/1971 | Slack | 264/DIG. 47 |
| 3,570,054 | 3/1971 | Seanor et al. | 425/66 X |

*Primary Examiner*—Robert D. Baldwin
*Attorney, Agent, or Firm*—Michael S. Striker

[57] ABSTRACT

Textile filamentary and fibrous products are made from thermoplastic film by forging the film between a hot roller with circumferential ribs and grooves and a hot film support roller, so that latent filament characteristics are imparted to the film, the process including the feature that the film is stretched longitudinally immediately before the forging step. Further process features include further stretching of the forged film in one or more zones, in one of which the film is split into filaments, while being stretched, by a transversely disposed pin which has the same pattern of ribs and grooves as has the film, and also has a lengthwise groove which the film bridges as it runs over the splitter pin.

11 Claims, 4 Drawing Figures

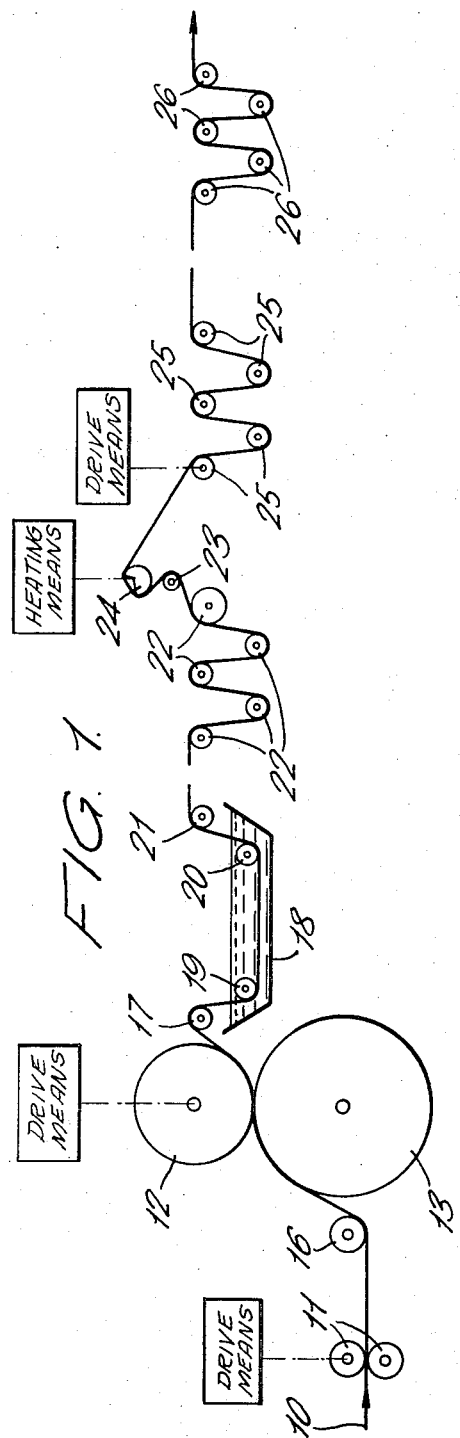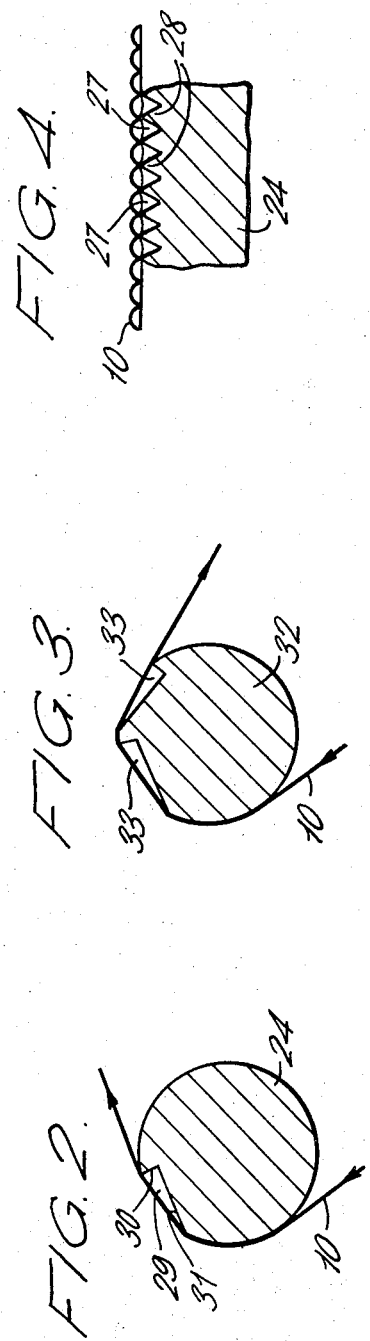

APPARATUS FOR MANUFACTURING FILAMENTARY AND FIBROUS TEXTILE PRODUCTS FROM THERMOPLASTIC FILM

This invention relates to apparatus for the manufacture of textile filamentary and fibrous products from suitable thermoplastic film.

According to the invention textile filamentary and fibrous products are made from thermoplastic film by subjecting an advancing film to a forging step under heat and pressure which imparts latent filament characteristics to the film, and stretching the advancing film longitudinally immediately before the forging step.

The film may be stretched longitudinally in a stretching step which follows the forging step.

Also according to the invention, the advancing film is stretched longitudinally in a stretching step which follows the forging step and which is simultaneous with a step involving splitting the film into filaments, the latent characteristics of which were imparted to the film by the forging step.

Also according to the invention, the advancing film is cooled immediately after the forging step, and immediately after the splitting step.

Apparatus according to the invention comprises a driven surface-contoured hot forging roller die which forms a nip with a hot film support roller and which is pressure-urged against the film to contour the film by forging and to form latent filaments therein, driven film feed and guide rollers located before the forging roller die, and between which rollers and the forging roller die a film feed speed differential is obtainable for stretching the film longitudinally immediately before the forging roller die, one or more film stretching means located after the forging roller die and providing at least one drawing zone in which the film is stretched longitudinally, the film splitting means in the drawing zone, or in one of the drawing zones, adapted to separate the film into filaments. Film cooling means may be provided immediately after the forging roller die and the film support roller.

The film splitting means may be in the form of one or more members disposed transversely of the film and which provide, in sequence in the direction of film travel, an arcuate heated surface which has the same surface contouring as the forged film and which is spaced by a transverse gap from a continuation of said surface which may be arcuate or flat.

The film splitting means may be in the form of a heated cylindrical or part-cylindrical rod about which the film travels, the rod having an arcuate surface having the same contouring as the forged film, and also having at least one lengthwise groove in said arcuate surface across which the film bridges as it travels about the rod. The rod may have two such grooves, which are bridged in sequence as the film travels about the arcuate surface of the rod.

The or each groove may be defined by two flat surfaces, that flat surface which is downstream in the direction of film travel being radial or approximately radial to the arcuate surface of the rod and also at or approximately at 90° to the other flat surface.

This invention will now be further described with reference to the accompanying diagrammatic drawings, in which:

FIG. 1 is a diagrammatic lay-out of apparatus for the manufacture of textile filaments from thermoplastic film material.

FIG. 2 is a cross-sectional diagram of a film splitting rod.

FIG. 3 is a similar view to FIG. 2 of an alternative form of film splitting rod.

FIG. 4 is a fragmentary longitudinal section of a film splitting rod.

Referring to FIG. 1 of the drawings, thermoplastic film 10, such as polypropylene film, advances through driven film feed and guide rollers (drive means are diagrammatically shown in FIG. 1), indicated as a pair of nip rollers 11, to a heated surface-contoured driven (drive means are diagrammatically shown in FIG. 1); forging roller die 12 which forms a nip with a heated film support roller 13, the film 10 being led by a guide roller 16 to lie upon the support roller 13 well in advance of the nip between the support roller 13 and the forging roller die 12. The latter is surface-contoured to have a surface pattern of alternate circumferential grooves and ribs, for example of V-section, typical temperatures of the support roller being 140° to 170°C and of the forging roller die being 80° to 100°C. The forging roller die forges the film 10 by deformation, and imparts latent filament characteristics to the film in that it is rendered subsequently splittable into filaments along longitudinal lines of weakness forged into the film.

The film 10 is stretched longitudinally between the nip rollers 11 and the nip of the forging roller die and the support roller 13, by providing a speed differential with roller 12 and 13 rotating faster than the nip rollers 11, the draw point of the film being in the region where it is laid upon the support roller 13 by the roller 16.

From the nip of the support roller 13 and the forging roller die, 12, the film passes in an upward direction to a guide roller 17, thus being positively stripped from the heated support roller 13, and from the guide roller 17 the film is led through a cooling zone provided as by a water bath 18 and further guide rollers 19, 20, 21.

The film then passes to a set of godet rollers 22 of conventional form, which can be used to further stretch the film 10, if desired, but in the arrangement shown in FIG. 1 are not so used because from the last godet roller 22 the film passes upwardly, via a guide roller 23, to travel about a heated splitter rod 24, described in more detail below, which has a surface pattern of alternate circumferential grooves and ribs of the same pitch as those of the forging roller die 12, and hence has the same surface contouring as the forged film. If the set of godet roller 22 is used to stretch the film, the latter is narrowed due to the longitudinal stretching and the surface contouring of the film does not then agree with that of the forging roller die. The pitch of the grooves and ribs of the splitter rod is then chosen to provide the same surface contouring as the film possesses after stretching, the grooves and ribs of the splitter rod being closer together than those of the forging roller die. Thus the splitter rod separates the film into filaments along the lines of weakness forged into the film by the forging roller die.

From the splitter rod 24 the film 10 travels to another set of godet rollers 25, the film being cooled between the pin 24 and the first of the godet rollers 25, either by providing a long enough gap between the pin 24 and the first godet roller 25 for there to be a cooling zone effect, or by positively cooling the film as by an air jet or the like. The godet rollers 25 (whose drive means are diagrammatically shown in FIG. 1) are rotating faster than the godet rollers 22, so that the film is stretched as well as being split into filaments, and since the splitter rod 24 is heated to approximately 140°C the draw point of the film is on the rod.

The web of filaments now passes from the set of godet rollers 25 to a further set of godet rollers 26, and between the two sets the web of filaments is further stretched. One or more further sets of godet rollers may be provided to apply further stretching, if desired, before the filaments are wound up as filaments which when relaxed are crimped in that they exhibit more or less regularly reversing helix configurations.

FIGS. 2 and 4 show the sectional forms of a splitter rod 24 in the form of a cylinder, the arcuate surface of which is provided with alternate circumferential grooves 27 and ribs 28 of V-shaped cross-section. The rod shown in FIG. 2 is also provided with a longitudinal groove 29 across which the film 10 bridges as it travels about the rod. The groove 29 is defined by two flat surfaces, that surface 30 which is downstream in the direction of film travel being radial or approximately radial and also at or approximately at 90° to the other flat surface 31. As previously mentioned the rod 24 is heated (heating means is diagrammatically shown in FIG. 1), and the gap defined by the groove 29, across which the film 10 bridges, acts as a cooling zone for the film by virtue of its extent. If desired the film can be positively cooled where it bridges the gap, as by an air jet or the like.

As already stated the pitch of the grooves and ribs of the splitter rod 24 is the same as that of the forging roller die 12, and as illustrated in FIG. 4. the action of the splitter rod is that the ribs 28 act along the lines of weakness forged into the film by the forging roller die 12, from the opposite side of the film 10 to that operated upon by the forging roller die 12, and the actual splitting occurring as the film re-contacts the splitter rod ribs 28 after bridging the gap defined by the groove 29.

The splitter rod 32 shown in cross-section in FIG. 3 has two spaced longitudinal grooves 33 in all respects similar to the groove 29 of the rod 24 shown in FIG. 2. The path of the film 10 about the rod 32 is indicated, and shows that the film bridges both of the gaps defined by the grooves 33. The rod 32 thus has a twice-repeated splitting action upon the film as it passes about the rod. The surface contoured ribs and grooves form of the rod 32 is the same as is shown in FIG. 4.

It will be appreciated that the film splitting means need not be in the form of a single member such as the cylindrical rod shown in FIGS. 2 and 3, although a single splitter rod is the most convenient embodiment. For example the splitter rod of FIG. 2 need only be part-cylindrical, or could be in the form of two separate rod-like members spaced by a gap which replaces the groove 29, that member which is upstream of the gap providing an arcuate heated first surface which has the same surface contouring as the forged film which is being split, and that member which is downstream of the gap forming a second surface which also has the same surface contouring as the forged film, and which is either arcuate or flat and which can also be adjustable as to its positioning relative to the upstream member. Similarly the splitter rod of FIG. 3 need only be part-cylindrical, or could be in the form of two or even three separate members with a gap or gaps between them.

I claim:

1. In an apparatus for manufacturing filamentary and fibrous textile products from thermoplastic film, a combination comprising film embossing means for embossing an advancing thermoplastic film so as to form latent filament characteristics therein, comprising a surface-contoured forging roller die and a heated film support roller which together define a nip for advancement therethrough of thermoplastic film to be embossed; film engaging rollers upstream of said film embossing means for feeding and guiding the engaged film in direction toward said means; film stretching rollers downstream of said embossing means for stretching the embossed film longitudinally of the same; drive means for driving said rollers and said roller die, and for rotating at least said film engaging rollers and said roller die at differential speeds to stretch said film longitudinally of the latter immediately upstream of said nip; and film splitting means for splitting the embossed film into filaments.

2. A combination as defined in claim 1; and further comprising cooling means for cooling the embossed film immediately downstream of said nip.

3. A combination as defined in claim 1, wherein said film splitting means comprises a stationary film splitting device.

4. A combination as defined in claim 1, wherein said drive means comprises drives operative for rotating said film engaging rollers and said roller die at lower and higher peripheral speeds, respectively.

5. A combination as defined in claim 1, wherein said drive means comprises drives operative for rotating said film engaging rollers at a first peripheral speed, said roller die at a second peripheral speed higher than said first speed, and said film stretching rollers at a third peripheral speed higher than said second speed.

6. A combination as defined in claim 1, wherein said film splitting means comprises at least one member extending transversely of the direction of advancement of said film and having an arcuate surface portion provided with surface contouring corresponding to that of the embossed film, an additional surface portion spaced from said arcuate surface portion in said direction by a gap, and heating means for heating said arcuate surface portion.

7. A combination as defined in claim 6, wherein said additional surface portion is an arcuate surface portion.

8. A combination as defined in claim 6, wherein said additional surface portion is a flat surface portion.

9. A combination as defined in claim 6, wherein said member is a rod having an arcuate circumference provided with said arcuate surface portion and with an axial groove constituting said gap.

10. A combination as defined in claim 9, wherein said circumference of said rod is provided with an additional axial groove, and wherein said film bridges said grooves sequentially.

11. A combination as defined in claim 9, wherein said groove is bounded by two flat sidewalls one of which is located downstream of the other with reference to the direction of advancement of said film, said one flat sidewall extending at least substantially radial to said arcuate surface portion and being inclined at substantially 90° with reference to said other flat sidewall.

* * * * *